United States Patent
Nguyen (10) Patent No.: US 9,852,539 B2
(45) Date of Patent: Dec. 26, 2017

(54) SINGLE PASS SURFACE SPLATTING

(71) Applicant: QUALCOMM Incorporated, San Diego, CA (US)

(72) Inventor: Phi Hung Le Nguyen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 118 days.

(21) Appl. No.: 14/632,607

(22) Filed: Feb. 26, 2015

(65) Prior Publication Data

US 2016/0253838 A1    Sep. 1, 2016

(51) Int. Cl.
*G06T 15/40* (2011.01)
*G06T 15/08* (2011.01)

(52) U.S. Cl.
CPC .......... *G06T 15/405* (2013.01); *G06T 15/08* (2013.01); *G06T 15/40* (2013.01); *G06T 2210/56* (2013.01)

(58) Field of Classification Search
CPC ....... G06T 15/005; G06T 15/04; G06T 15/08; G06T 15/10–15/405
See application file for complete search history.

(56) References Cited

U.S. PATENT DOCUMENTS

| | | | |
|---|---|---|---|
| 6,466,207 B1 * | 10/2002 | Gortler | G06T 15/205 345/419 |
| 6,509,902 B1 | 1/2003 | Pfister et al. | |
| 6,639,597 B1 | 10/2003 | Zwicker et al. | |
| 7,170,515 B1 | 1/2007 | Zhu | |
| 7,215,340 B2 | 5/2007 | Pfister et al. | |
| 8,207,975 B1 * | 6/2012 | Molnar | G06T 15/005 345/426 |
| 2006/0098021 A1 * | 5/2006 | Rim | G06F 12/0223 345/543 |
| 2007/0103479 A1 * | 5/2007 | Kim | G06T 15/205 345/581 |

OTHER PUBLICATIONS

Zwicker et al., Surface Splatting, Proceedings of ACM SIGGRAPH 2001, Aug. 2001, pp. 371-378.*
Zhang et al., "Single-Pass Point Rendering and Transparent Shading," Eurographics Symposium on Point-Based Graphics, Jul. 29-30, 2006, M. Botsch, B. Chen (Ed.), 12 pp.
Ren et al. "Object Space EWA Surface Splatting: A Hardware Accelerated Approach to High Quality Point Rendering," Eurographics, vol. 21, No. 3, Jul. 2002, 11 pp.

(Continued)

*Primary Examiner* — Charles Tseng
(74) *Attorney, Agent, or Firm* — Schumaker & Sieffert, P.A.

(57) ABSTRACT

At least one processor may retrieve from a framebuffer a depth value associated with a pixel. The at least one processor may determine whether a fragment depth value associated with a fragment of a splat is within a non-zero offset of the depth value associated with the pixel. Responsive to determining that the fragment depth value associated with the fragment of the splat is within the non-zero offset of the depth value associated with the pixel, the at least one processor may output updated data for the pixel to the framebuffer based at least in part on data associated with the fragment of the splat.

24 Claims, 6 Drawing Sheets

(56) References Cited

OTHER PUBLICATIONS

Botsch et al., "High-Quality Surface Splatting on Today's GPUs," Eurographics Symposium on Point-Based Graphics, Feb. 2005, 9 pp.

Zwicker et al., "Surface Splatting," Mitsubishi Electric Research Laboratories, Jun. 2001, 11 pp.

Botsch, et al., "High-Quality Surface Splatting on Today's GPUs", Point-Based Graphics, 2005, Eurographics/IEEE VGTC Symposium Proceedings; Jun. 21-22, 2005, IEEE, pp. 17-24, XP010830039, ISBN: 978-3-905673-20-3.

International Search Report and Written Opinion from International Application No. PCT/US2016/017863, dated Jul. 15, 2016, 11 pp.

Tavares, et al., "Efficient Approximate Visibility of Point Sets on the GPU", 23rd Sibgrapi Conference on Graphics, Patterns and Images (SIBGRAPI), IEEE, Aug. 30, 2010, pp. 239-246, XP031981857, DOI: 10.1109/SIBGRAPI.2010.40, ISBN: 978-1-4244-8420-1.

Zhang, et al., "Deferred Blending: Image Composition for Single-Pass Point Rendering", Computers and Graphics, Elsevier, GB, vol. 31, No. 2, Apr. 1, 2007, pp. 175-189, XP022016476, ISSN: 0097-8493, DOI: 10.1 016/J.CAG.2006.11.012.

Response to the Written Opinion dated Jul. 15, 2016 in International Application No. PCT/US2016/017863, filed Nov. 7, 2016, 4 pp.

Second Written Opinion issued in International Application No. PCT/US2016/017863, dated Mar. 31, 2017, 5 pp.

\* cited by examiner

SINGLE PASS SURFACE SPLATTING

TECHNICAL FIELD

The disclosure relates to point-based rendering of three-dimensional surfaces.

BACKGROUND

Visual content for display, such as content for graphical user interfaces and video games, may be generated by a graphics processing unit (GPU). A GPU may convert two-dimensional or three-dimensional (3D) objects into a two-dimensional (2D) pixel representation that may be displayed.

Point-based rendering of three-dimensional surfaces is a graphics rendering technique in which three-dimensional surfaces may be made up of a group of point primitives (also known as a point cloud). For a three-dimensional surface, a point cloud may be non-uniform distributed samples of the surface. Unlike rendering techniques that utilize triangle primitives, the point primitives utilized in point-based rendering do not include any connective information between point primitives.

Point-based rendering may be useful in the context of three-dimensional scanning Three-dimensional scanning devices may generate a large point cloud (e.g., millions of points) which may be difficult and computationally expensive to convert into a connected set of triangle primitives (e.g., a triangle mesh) that are then used as inputs for subsequent rendering. In contrast, point-based rendering techniques may utilize the raw data produced by three-dimensional scanning devices as input. In this way, point-based rendering techniques may be more efficient than triangle-based rendering techniques in certain applications.

SUMMARY

In general, aspects of the disclosure are directed to techniques for a single pass surface splatting of a point cloud to render three-dimensional surfaces and objects. The single pass surface splatting techniques may omit the performance of a visibility pass that renders a depth image to the framebuffer prior to an accumulation pass, thereby increasing the rendering performance of the graphics processing unit. In this sense, rather than a visibility pass and an accumulation pass for surface splatting, the techniques may implement surface splatting in a single pass.

In one aspect, the disclosure is directed to a method for rendering a fragment to a framebuffer. The method includes retrieving, by at least one processor from a framebuffer, a depth value associated with a pixel. The method further includes determining, by the at least one processor, whether a fragment depth value associated with a fragment of a splat is within a non-zero offset of the depth value associated with the pixel. The method further includes responsive to determining that the fragment depth value associated with the fragment of the splat is within the non-zero offset of the depth value associated with the pixel, outputting, by the at least one processor, updated data for the pixel to the framebuffer based at least in part on data associated with the fragment of the pixel.

In another aspect, the disclosure is directed to a device. The device may include a framebuffer. The device may further include at least one processor configured to: retrieve, from the framebuffer, a depth value associated with a pixel; determine whether a fragment depth value associated with a fragment of a splat is within a non-zero offset of the depth value associated with the pixel; and responsive to determining that the fragment depth value associated with the fragment of the splat is within the non-zero offset of the depth value associated with the pixel, output updated data for the pixel to the framebuffer based at least in part on data associated with the fragment of the splat.

In another aspect, the disclosure is directed to a computer-readable storage medium having instructions stored thereon that when executed cause one or more processors to: retrieve, from a framebuffer, a depth value associated with a pixel; determine whether a fragment depth value associated with a fragment of a splat is within a non-zero offset of the depth value associated with the pixel; and responsive to determining that the fragment depth value associated with the fragment of the splat is within the non-zero offset of the depth value associated with the pixel, outputting updated data for the pixel to the framebuffer based at least in part on data associated with the fragment of the splat.

In another aspect, the disclosure is directed to a device comprising: means for retrieving, from a framebuffer, a depth value associated with a pixel; means for determining whether a fragment depth value associated with a fragment of a splat is within a non-zero offset of the depth value associated with the pixel; and means for responsive to determining that the fragment depth value associated with the fragment of the splat is within the non-zero offset of the depth value associated with the pixel, outputting updated data for the pixel to the framebuffer based at least in part on data associated with the fragment of the splat.

The details of one or more aspects of the disclosure are set forth in the accompanying drawings and the description below. Other features, objects, and advantages of the disclosure will be apparent from the description and drawings, and from the claims.

DETAILED DESCRIPTION

In general, aspects of the disclosure are directed to techniques for a single pass surface splatting of a point cloud to render three-dimensional surfaces and objects.

Rendering a three-dimensional object from a point cloud may include taking as input a set of point primitives, warping the point primitives from three-dimensional space to two-dimensional space, constructing a continuous surface made up of surface samples from the point primitives, including generating additional surface samples to prevent artifacts such as holes between the surface samples, filtering the continuous surface, and sampling the continuous surface at output positions to render a representation of a three-dimensional object from the point cloud.

Similar to other techniques for rendering three-dimensional objects, for rendering a three-dimensional object from a point cloud, a graphics processing unit (GPU) may perform a depth test to determine which portions of the three-dimensional object is visible and which portions of the three-dimensional object is hidden (e.g., occluded) when the three-dimensional object is rendered to a two-dimensional image space. To determine if a particular fragment of the three-dimensional object is rendered to a pixel, the GPU may compare the depth of the particular fragment with the depth of any other fragments that has already been rendered to the pixel, and the GPU may render the particular fragment to the pixel only if the particular fragment is closer to a specified viewpoint than any of the other fragments previously rendered to the pixel. In this way, the GPU may hide any three-dimensional surfaces that, from the specified viewpoint, are behind other three-dimensional surfaces.

Performing such a depth test may be useful for rendering techniques that utilize triangle primitives because, in such rendering techniques, neighboring triangle primitives of the same surface do not overlap but instead are connected to each other. In contrast, techniques for point based rendering utilize point primitives which may be disc-shaped and/or ellipse-shaped primitives that do not contain any connectivity information. Neighboring point primitives of the same surface may overlap due to their non-uniformly distributed and non-connected nature as well as to prevent discontinuities (e.g., holes) between neighboring points primitives.

As such, if fragments of multiple points primitives of the same surface overlap, the GPU may blend these overlapping fragments to prevent potential artifacting of the rendered representation of the surface. However, because these multiple overlapping fragments may have slightly different depth values, if the GPU performs the aforementioned depth test as part of performing point-based rending, the GPU may render, for a pixel, only the front-most fragment of the surface and may prevent the rendering of any other overlapping fragments of the same surface, thereby potentially introducing artifacting to the rendered surface. In other words, rather than blending the point primitives, the GPU would render only one point primitive, thereby potentially introducing artifacts in the rendered surface.

In one exemplary depth test technique for point-based rendering, the GPU may performing a visibility pass by rendering a three-dimensional object as a depth image into the framebuffer at an offset ϵ away from the viewpoint, such that the three-dimensional object is rendered is further away from the viewpoint by the offset ϵ in comparison to its specified position in three-dimensional space. The GPU, when rendering the three-dimensional object as a depth image, may not write any color values for the depth image into the color buffers of the framebuffer, and may write depth values of the depth image into the depth buffer of the framebuffer. Subsequent to performing the visibility pass, the GPU performs an accumulation pass that accumulates the color and alpha values of the three-dimensional object into the color buffers of the framebuffer but does not update the depth buffer with the depth values of the image. In this way, the GPU may, during the accumulation pass, perform the aforementioned depth test on the three-dimensional object by comparing its depth with the depth of the depth image generated during the visibility pass, such that the GPU discards portions of the rendered three-dimensional object that are behind corresponding portions of the depth image in the framebuffer. However, such a technique may be inefficient because the GPU performs two separate rendering passes: a visibility pass and an accumulation pass, on the three-dimensional object.

Subsequently to performing the accumulation pass, the GPU may perform a normalization pass to normalize the color values of pixels in the framebuffer to eliminate visual artifacts. Such visual artifacts, such as variances in color brightness, may occur when the sum of alpha values of the accumulated color values for a particular pixel does not sum up to 1. As such, during the normalization pass, the GPU may, for each pixel in the framebuffer, divide the accumulated color values by the sum of weights stored in the alpha values to produce final color values for each destination pixel. For example, given that each of the accumulated color values include RGB values as well as an alpha value, the GPU may perform a weighted sum of the RGB values that are weighed according to the associated alpha values. The GPU may divide the weighed sum of RGB values by the sum of the alpha values of the accumulated color values to produce a final set of RGB values, such that the final color values for each destination pixel is the final set of RGB values computed for the destination pixel and an alpha value of 1.

In this example, the GPU may perform the visibility pass for each pixel in the framebuffer. Subsequent to performing the visibility pass for each pixel in the framebuffer, the GPU may perform the accumulation pass for each pixel in the framebuffer. Subsequent to performing the accumulation pass for each pixel in the framebuffer, the GPU may perform the normalization pass for each pixel in the framebuffer.

In accordance with aspects of the present disclosure, the GPU may be able to eliminate the visibility pass when rendering an image from a point cloud by being able to read depth values from the depth buffer of the framebuffer. For example, the GPU may perform depth test as part of the accumulation pass. As described in more detail, when rendering a fragment of a splat to a pixel, a GPU may read from the framebuffer the depth value associated with the pixel. The GPU may compare the depth of the fragment to be rendered with the depth value retried from the framebuffer to determine whether to render the color values and the alpha value for the pixel into the framebuffer based on whether the depth of the fragment is within a non-zero offset of the depth value associated with the pixel. As such, the GPU may retrieve from a framebuffer a depth value associated with a pixel. The GPU may determine whether a fragment depth value associated with a fragment is within a non-zero offset of the depth value associated with the pixel. Responsive to determining that the fragment depth value associated with the fragment is within the non-zero offset of the depth value associated with the pixel, the GPU may output updated data for the pixel to the framebuffer based at least in part on data associated with the fragment.

Figure 1:
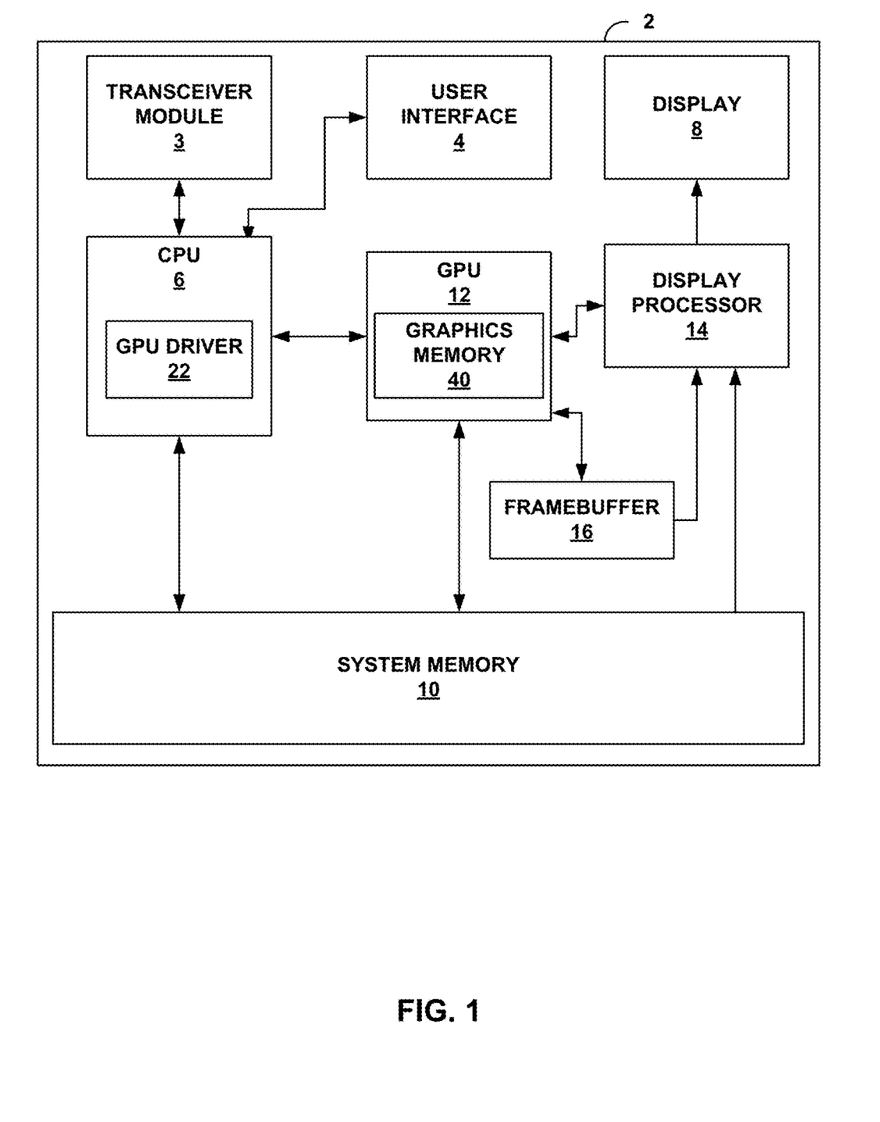
FIG. 1 is a block diagram illustrating an example computing device that may be configured to implement one or more aspects of this disclosure.

FIG. 1 is a block diagram illustrating an example computing device that may be configured to implement one or more aspects of this disclosure. As shown in FIG. 1, computing device 2 may be a computing device including but not limited to video devices, media players, set-top boxes, wireless handsets such as mobile telephones and so-called smartphones, personal digital assistants (PDAs), desktop computers, laptop computers, gaming consoles, video conferencing units, tablet computing devices, and the like. In the example of FIG. 1, computing device 2 may include central processing unit (CPU) 6, system memory 10, and GPU 12. Computing device 2 may also include display processor 14, transceiver module 3, user interface 4, and display 8. Transceiver module 3 and display processor 14 may both be part of the same integrated circuit (IC) as CPU 6 and/or GPU 12, may both be external to the IC or ICs that include CPU 6 and/or GPU 12, or may be formed in the IC that is external to the IC that includes CPU 6 and/or GPU 12.

Computing device 2 may include additional modules or units not shown in FIG. 1 for purposes of clarity. For example, computing device 2 may include a speaker and a microphone, neither of which are shown in FIG. 1, to effectuate telephonic communications in examples where computing device 2 is a mobile wireless telephone, or a speaker where computing device 2 is a media player. Computing device 2 may also include a video camera. Furthermore, the various modules and units shown in computing device 2 may not be necessary in every example of computing device 2. For example, user interface 4 and display 8 may be external to computing device 2 in examples where computing device 2 is a desktop computer or other device that is equipped to interface with an external user interface or display.

Examples of user interface 4 include, but are not limited to, a trackball, a mouse, a keyboard, and other types of input devices. User interface 4 may also be a touch screen and may be incorporated as a part of display 8. Transceiver module 3 may include circuitry to allow wireless or wired communication between computing device 2 and another device or a network. Transceiver module 3 may include modulators, demodulators, amplifiers and other such circuitry for wired or wireless communication.

CPU 6 may be a microprocessor, such as a central processing unit (CPU) configured to process instructions of a computer program for execution. CPU 6 may comprise a general-purpose or a special-purpose processor that controls operation of computing device 2. A user may provide input to computing device 2 to cause CPU 6 to execute one or more software applications. The software applications that execute on CPU 6 may include, for example, an operating system, a word processor application, an email application, a spreadsheet application, a media player application, a video game application, a graphical user interface application or another program. Additionally, CPU 6 may execute GPU driver 22 for controlling the operation of GPU 12. The user may provide input to computing device 2 via one or more input devices (not shown) such as a keyboard, a mouse, a microphone, a touch pad or another input device that is coupled to computing device 2 via user interface 4.

The software applications that execute on CPU 6 may include one or more graphics rendering instructions that instruct CPU 6 to cause the rendering of graphics data to display 8. In some examples, the software instructions may conform to a graphics application programming interface (API), such as, e.g., an Open Graphics Library (OpenGL®) API, an Open Graphics Library Embedded Systems (OpenGL ES) API, a Direct3D API, an X3D API, a RenderMan API, a WebGL API, an Open Computing Language (OpenCL™) or any other public or proprietary standard GPU compute API. In order to process the graphics rendering instructions, CPU 6 may issue one or more graphics rendering commands to GPU 12 (e.g., through GPU driver 22) to cause GPU 12 to perform some or all of the rendering of the graphics data. In some examples, the graphics data to be rendered may include a list of graphics primitives, e.g., points, lines, triangles, quadrilaterals, triangle strips, etc.

GPU 12 may be configured to perform graphics operations to render one or more graphics primitives to display 8. Thus, when one of the software applications executing on CPU 6 requires graphics processing, CPU 6 may provide graphics commands and graphics data to GPU 12 for rendering to display 8. The graphics data may include, e.g., drawing commands, state information, primitive information, texture information, etc. GPU 12 may, in some instances, be built with a highly-parallel structure that provides more efficient processing of complex graphic-related operations than CPU 6. For example, GPU 12 may include a plurality of processing elements, such as shader units, that are configured to operate on multiple vertices or pixels in a parallel manner. The highly parallel nature of GPU 12 may, in some instances, allow GPU 12 to draw graphics images (e.g., GUIs and two-dimensional (2D) and/or three-dimensional (3D) graphics scenes) onto display 8 more quickly than drawing the scenes directly to display 8 using CPU 6.

GPU 12 may, in some instances, be integrated into a motherboard of computing device 2. In other instances, GPU 12 may be present on a graphics card that is installed in a port in the motherboard of computing device 2 or may be otherwise incorporated within a peripheral device configured to interoperate with computing device 2. In some examples, GPU 12 may be on-chip with CPU 6, such as in a system on chip (SOC) GPU 12 may include one or more processors, such as one or more microprocessors, application specific integrated circuits (ASICs), field programmable gate arrays (FPGAs), digital signal processors (DSPs), or other equivalent integrated or discrete logic circuitry. GPU 12 may also include one or more processor cores, so that GPU 12 may be referred to as a multi-core processor.

In some examples, graphics memory 40 may be part of GPU 12. Thus, GPU 12 may read data from and write data to graphics memory 40 without using a bus. In other words, GPU 12 may process data locally using a local storage, instead of off-chip memory. Such graphics memory 40 may be referred to as on-chip memory. This allows GPU 12 to operate in a more efficient manner by eliminating the need of GPU 12 to read and write data via a bus, which may experience heavy bus traffic and associated contention for bandwidth. In some instances, however, GPU 12 may not include a separate memory, but instead utilize system memory 10 via a bus. Graphics memory 40 may include one or more volatile or non-volatile memories or storage devices, such as, e.g., random access memory (RAM), static RAM (SRAM), dynamic RAM (DRAM), erasable programmable ROM (EPROM), electrically erasable programmable ROM (EEPROM), Flash memory, a magnetic data media or an optical storage media.

In some examples, GPU 12 may store a fully formed image in system memory 10. Display processor 14 may retrieve the image from system memory 10 and/or framebuffer 16 and output values that cause the pixels of display 8 to illuminate to display the image. Display 8 may be the display of computing device 2 that displays the image content generated by GPU 12. Display 8 may be a liquid crystal display (LCD), an organic light emitting diode display (OLED), a cathode ray tube (CRT) display, a plasma display, or another type of display device.

In accordance with aspects of the present disclosure, GPU 12 may retrieve from framebuffer 16 a depth value associated with a pixel. GPU 12 may determine whether a fragment depth value associated with a fragment is within a non-zero offset of the depth value associated with the pixel. Responsive to determining that the fragment depth value associated with the fragment is within the non-zero offset of the depth value associated with the pixel, GPU 12 may output updated data for the pixel to framebuffer 16 based at least in part on data associated with the fragment.

Figure 2:
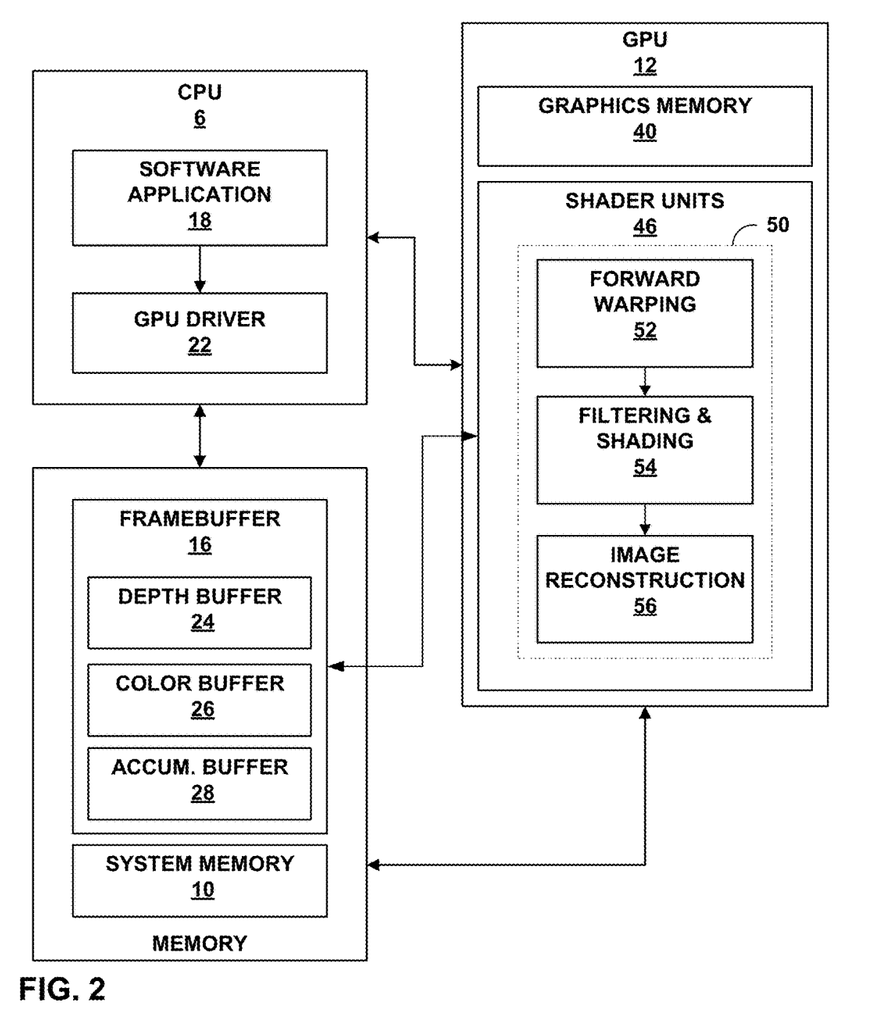
FIG. 2 is a block diagram illustrating example implementations of the example processor, the example GPU, and the example system memory of FIG. 1.

FIG. 2 is a block diagram illustrating example implementations of CPU 6, GPU 12, and system memory 10 of FIG. 1. As shown in FIG. 2, CPU 6 may execute at least one software application 18 and GPU driver 22, each of which may be one or more software applications or services.

Memory available to CPU 6 and GPU 12 may include system memory 10 and framebuffer 16. Framebuffer 16 may be a part of system memory 10 or may be separate from system memory 10. Framebuffer 16 may store rendered image data, such as pixel data, as well as any other data. In some examples, framebuffer 16 may store a set of data associated with each pixel that is to be outputted to display 8. For each pixel, the associated set of data may include one or more color values, such as red, green, blue, and alpha components, one or more depth values, and the like.

Software application 18 may be any application that utilizes the functionality of GPU 12. For example, software application 18 may be a GUI application, an operating system, a portable mapping application, a computer-aided design program for engineering or artistic applications, a video game application, or another type of software application that uses 2D or 3D graphics.

Software application 18 may include one or more drawing instructions that instruct GPU 12 to render a graphical user interface (GUI) and/or a graphics scene. For example, the drawing instructions may include instructions that define a set of one or more graphics primitives, such as points, to be rendered by GPU 12. In some examples, the drawing instructions may, collectively, define all or part of a plurality of windowing surfaces used in a GUI. In additional examples, the drawing instructions may, collectively, define all or part of a graphics scene that includes one or more graphics objects within a model space or world space defined by the application.

Software application 18 may invoke GPU driver 22, to issue one or more commands to GPU 12 for rendering one or more graphics primitives into displayable graphics images. For example, software application 18 may invoke GPU driver 22 to provide primitive definitions to GPU 12. In some instances, the primitive definitions may be provided to GPU 12 in the form of a list of points primitives making up a point cloud. Each points primitive in the point cloud may be a surface element (surfel) that describes a surface in a small neighborhood. A surfel has a position and a color. In some examples, a surfel may also have a normal, a radius, and the like. As such, a primitive definition for each point may specify a position, a color, a normal, a radius, and the like for the associated point.

Based on the instructions issued by software application 18 to GPU driver 22, GPU driver 22 may formulate one or more commands that specify one or more operations for GPU 12 to perform in order to render the set of points primitives. When GPU 12 receives a command from CPU 6, one or more shader processors of shader units 46 may execute graphics processing pipeline 50 to decode the command, and may configure graphics processing pipeline 50 to perform the operation specified in the command. For example, graphics processing pipeline 50 may read and assemble the data into point primitives. After performing the specified operations, graphics processing pipeline 50 may process, rasterize, and render the point primitives and may output the rendered data to framebuffer 16 associated with a display device. In some examples, graphics processing pipeline 50 may be executed on programmable shader cores, such as shader units 46.

Framebuffer 16 may include one or more buffers that stores destination pixels for GPU 12, such as one or more of depth buffer 24, color buffer 26, and accumulation buffer 28. Each destination pixel may be associated with a unique screen pixel location. In some examples, framebuffer 16 may include color buffer 26 that stores color values for each destination pixel. For each destination pixel, color values may include color components and a destination alpha value. For example, color buffer 26 of framebuffer 16 may store Red, Green, Blue, Alpha (RGBA) components for each pixel where the "RGB" components correspond to red, green, and blue color values, respectively and the "A" component corresponds to a destination alpha value. Framebuffer 16 may also include a depth buffer 24 that stores a depth value for each destination pixel. The depth value stored by depth buffer 24 may indicate a relative distance of the destination pixel for a specific viewpoint. For example, the depth value may be a floating point number between 0 and 1, where a relatively smaller depth value indicates that the destination pixel is relatively closer to the viewpoint.

Framebuffer 16 may also include accumulation buffer 28 that accumulates multiple RGBA components that are written into framebuffer 16 for each destination pixel. For example, as discussed above, because fragments of multiple points that represent the same surface may overlap the same pixel, accumulation buffer 28 may store, for each destination pixel, RGBA components from each of the fragments of multiple points that represent the same surface and overlap the same destination pixel. Although framebuffer 16 and system memory 10 are illustrated as being separate memory units, in other examples, framebuffer 16 may be part of system memory 10. Further, in some examples, framebuffer 16 may also be able to store any suitable data other than pixels.

Graphics memory 40 may include on-chip storage or memory that is physically integrated into the integrated circuit chip of GPU 12. If graphics memory 40 is on-chip, GPU 12 may be able to read values from or write values to graphics memory 40 more quickly than reading values from or writing values to system memory 10 via a system bus.

In some examples, graphics processing pipeline 50 may include one or more of forward warping stage 52, filtering/shading stage 54, and image reconstruction stage 56. In some examples, these stages of the graphics processing pipeline may be considered shader stages. These shader stages may be implemented as one or more shader programs that execute on shader units 46 in GPU 12. Shader units 46 may be configured as a programmable pipeline of processing components. In some examples, shader units 46 may be referred to as "shader processors" or "unified shaders," and may perform geometry, vertex, fragment, or other shading operations as part of forward warping stage 52, filtering/shading stage 54, and/or image reconstruction stage 56 to render graphics. Shader units 46 may include one or more shader processors, each of which may be specialized microprocessors that include one or more components for fetching and decoding operations, one or more ALUs for carrying out arithmetic calculations, one or more memories, caches, and registers.

GPU 12 may designate shader units 46 to perform a variety of shading operations such as vertex shading, hull shading, domain shading, geometry shading, fragment shading, and the like by sending commands to shader units 46 to execute one or more of a vertex shader program, a hull shader program, a domain shader program, a geometry shader program, and a fragment shader program. In some examples, GPU driver 22 may cause a compiler executing on CPU 6 to compile one or more shader programs, and to download the compiled shader programs onto one or more programmable shader units contained within GPU 12. The shader programs may be written in a high level shading language, such as, e.g., an OpenGL Shading Language (GLSL), a High Level Shading Language (HLSL), a C for Graphics (Cg) shading language, an OpenCL C kernel, etc. The compiled shader programs may include one or more instructions that control the operation of shader units 46 within GPU 12 to execute graphics processing pipeline 50 and to perform various other graphics related operations.

In accordance with an aspect of the present disclosure, shader units 46 may execute graphics processing pipeline 50 to render three-dimensional surfaces from a set of points primitives. Graphics processing pipeline 50 may include forward warping stage 52, filtering/shading stage 54, and image reconstruction stage 56. In some examples, graphics processing pipeline 50 may include additional stages not illustrated in FIG. 2. In some examples, graphics processing pipeline 50 may also omit one or more of forward warping stage 52, filtering/shading stage 54, and image reconstruction stage 56. In some examples, shader units 46 may execute one or more shader programs, such as vertex shaders, fragment shaders, and the like to perform forward warping stage 52, filtering/shading stage 54, and image reconstruction stage 56 to render three-dimensional surfaces from a set of points primitives.

To perform forward warping stage 52, shader units 46 may perform perspective projection of each point in the point cloud to warp each point from the three-dimensional object space to the two-dimensional screen space, in order to create a two-dimensional representation of a three-dimensional object represented by the point cloud. Such warping of the point cloud from the three-dimensional object space to the two-dimensional screen space may be analogous to projecting triangle vertices to image space. Forward warping stage 52 is discussed in further detail with respect to FIG. 3.

To perform filtering/shading stage 54, shader units 46 may shade and filter each of the warped points primitive that is the result of forward warping stage 52. For example, shader units 46 may apply alpha masks to each of the warped points primitives to generate splat primitives. Shader units 46 may also filter the splat primitives to prevent antialiasing. Filtering/Shading stage 54 is discussed in further detail with respect to FIG. 4.

To perform image reconstruction stage 56, shader units 46 may reconstruct a continuous three-dimensional surface from the splat primitives. For example, shader units 46 may fill discontinuities between the set of splat primitives and may rasterize the set of splat primitives. Shader units 46 may perform an accumulation pass to render the set of points primitives, fragment by fragment, to framebuffer 16. Performing the accumulation pass may include performing a visibility test for each fragment and accumulating the color values of fragments that pass the visibility test in framebuffer 16. In other words, rather than separately implementing a visibility pass and an accumulation pass, the visibility test may be incorporated into the accumulation pass allowing for a single pass technique of splatting. Image reconstruction stage 56 is discussed in further detail with respect to FIGS. 5A and 5B.

Figure 3:
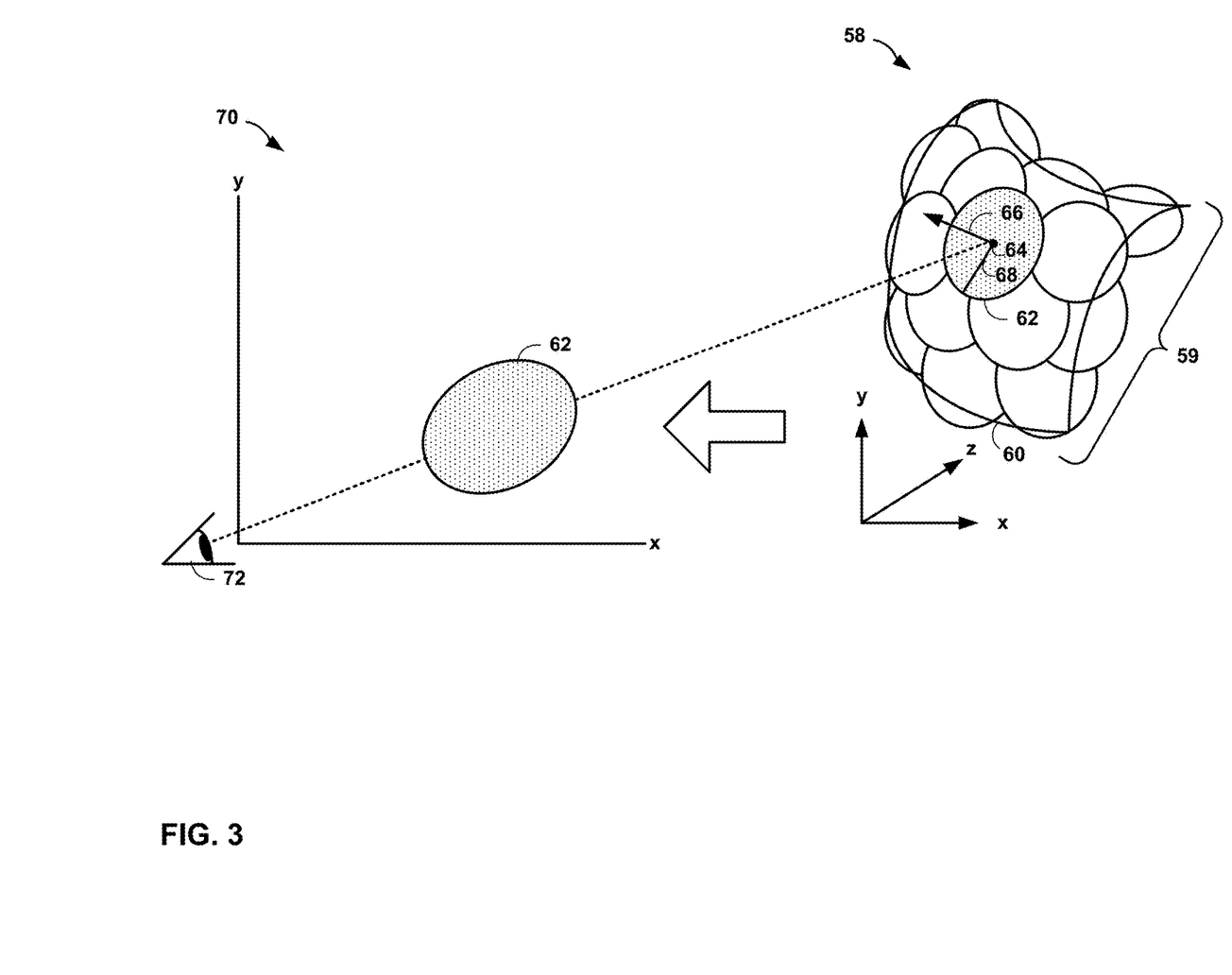
FIG. 3 is a block diagram illustrating an example operation of the forward warping stage of the graphics processing pipeline in further detail.

FIG. 3 is a block diagram illustrating an example operation of forward warping stage 52 of graphics processing pipeline 50 in further detail. As shown in FIG. 3, in forward warping stage 52 of graphics processing pipeline 50, shader units 46 may perform perspective projection of each point in the point cloud to warp each point from the three-dimensional object space 58 to the two-dimensional screen space 70. In representing a three-dimensional surface as a point cloud, each point in the point cloud may be represented by a surface element (surfel), which is a point rendering primitive that describes a small neighborhood of the three-dimensional surface. As such, each surfel may be associated with a surface area. For example, three-dimensional surface 60 may be represented by a set of disc-shaped surfels 59 that represents a set of points. Each surfel may be associated with at least a position and a color. For example, surfel 62 of the set of surfels 59 may be associated with position 64 and a color. In some examples, each surfel may also be associated with a normal and a radius. For example, surfel 62 may also be associated with normal 66 and radius 68.

Shader units 46 may, based at least in part on the position, radius, and/or normal of a surfel, project the surfel that is viewed from viewpoint 72, from object space 58 to screen space 70. For example, shader units 46 may, based on position 64, normal 66, and/or radius 68 of surfel 62, project surfel 62 from object space to screen space 70, such that surfel 62 in screen space 70 may be an ellipse.

Figure 4:
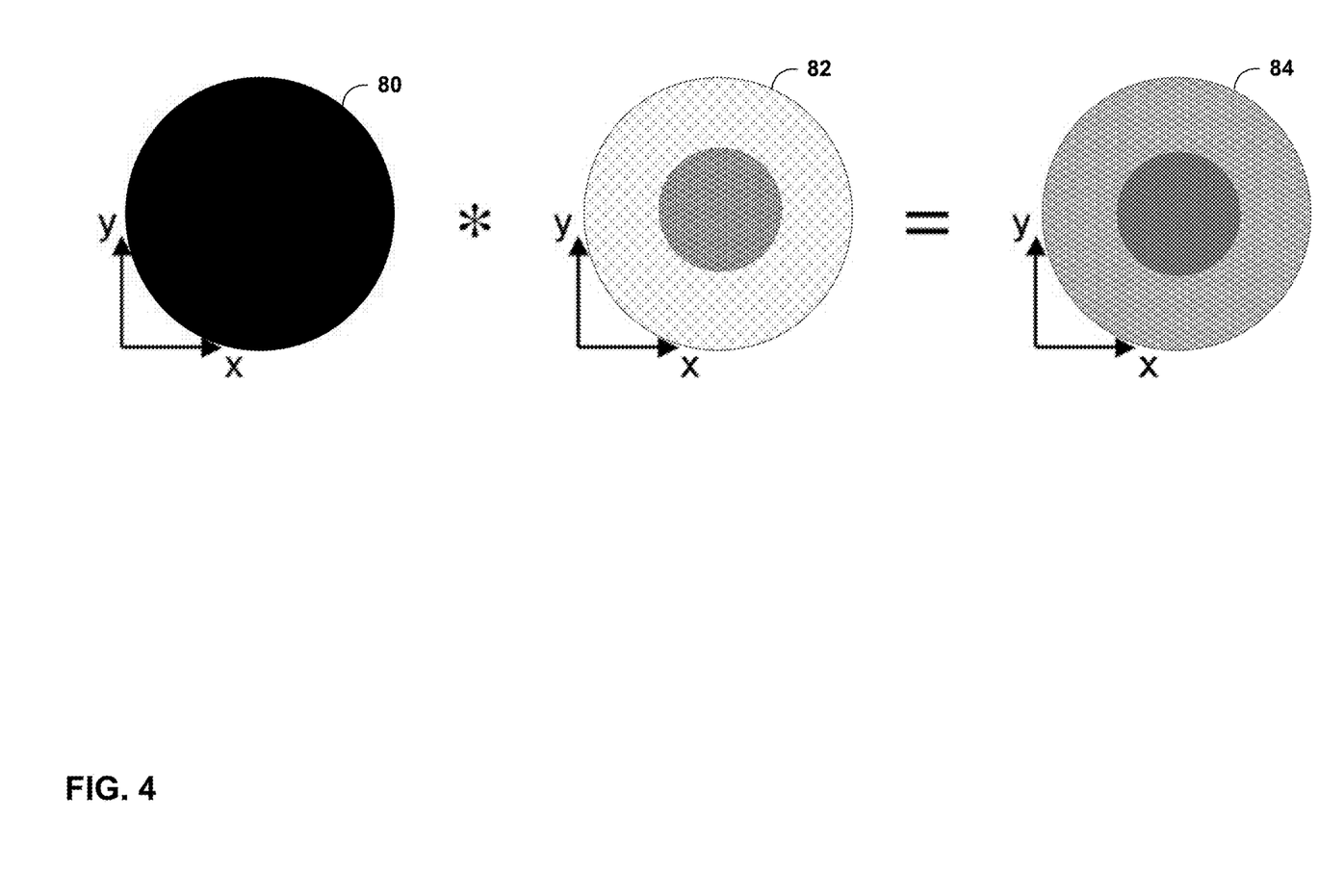
FIG. 4 is a block diagram illustrating an example operation of the filtering/shading stage of the graphics processing pipeline in further detail.

FIG. 4 is a block diagram illustrating an example operation of filtering/shading stage 54 of graphics processing pipeline 50 in further detail. As shown in FIG. 4, shader units 46 may perform per-point shading of the set of surfels resulting from shader units 46's performance of forward warping stage 52. Such shading may include conventional shading models such as phong shading and the like. Shader units 46 may, for each surfel, create a splat primitive by combining an alpha mask with the color. For example, given surfel 80 having a color value c, shader units 46 may apply alpha mask 82, such as a two-dimensional Gaussian function, having a set of alpha value w(x, y) to surfel 80 to result in splat 84 having a color and alpha value of c*w(x, y). Because the alpha values are position dependent, such that the alpha values for the alpha mask 82 may differ based on the specific (x, y) position on alpha mask 82, correspondingly splat 84 may also have different alpha values based on the specific (x, y) position of splat 84. As such, shader units 46 may transform a set of surfels resulting from performing forward warping stage 52 to a set of splats having both a color and a set of alpha values. In addition, shader units 46 may also perform antialiasing of the splats to eliminate aliasing artifacts.

Figure 5A:
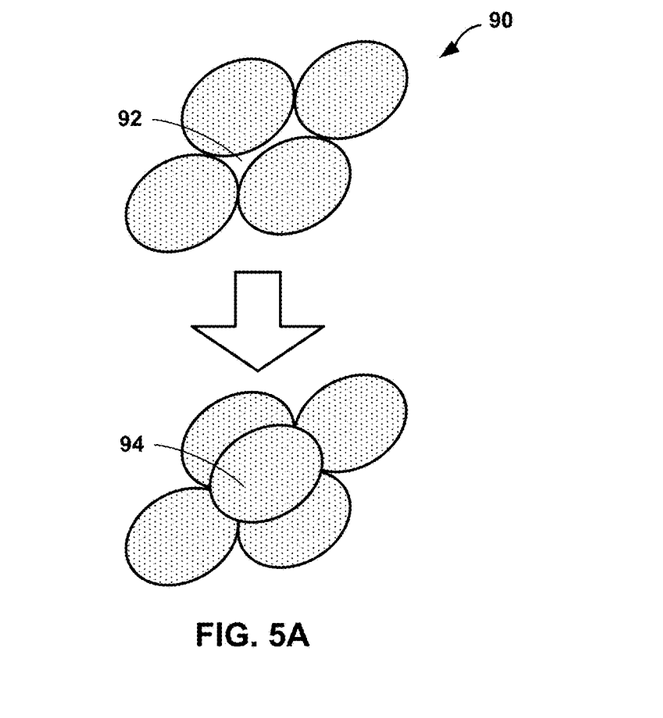
FIGS. 5A and 5B are block diagrams illustrating an example operation of the image reconstruction stage of the graphics processing pipeline in further detail.
Figure 5B:
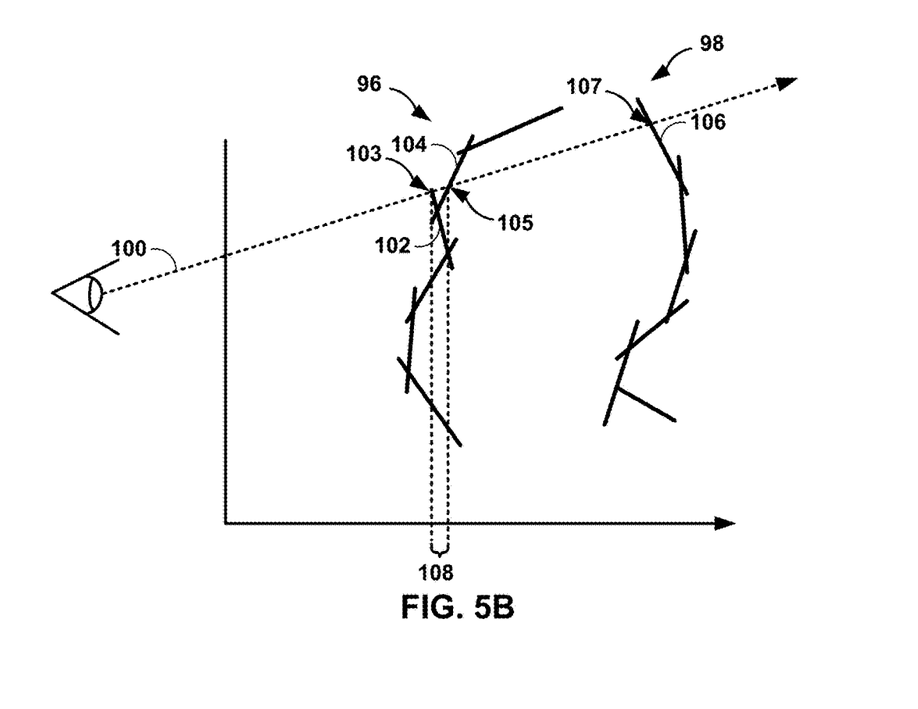

FIGS. 5A and 5B are block diagrams illustrating an example operation of image reconstruction stage 56 of graphics processing pipeline 50 in further detail. In image reconstruction stage 56, shader units 46 may reconstruct a continuous surface in image space from the splats that are a result of being processed in forward warping stage 52 and filtering/shading stage 54, and may render the reconstructed surface to framebuffer 16.

Because points in the point cloud are nonuniformly distributed in space, and because splats in two-dimensional screen space may be ellipse-shaped there may be discontinuities between splats. As such, in image reconstruction stage 56, shader units 46 may generate additional splats to cover such discontinuities between splats such that the set of splats may represent a continuous surface. As shown in the example of FIG. 5A, splats 90 may include discontinuity 92. Shader units 46, in image reconstruction stage 56, may determine that splats 90 includes discontinuity 92 and, in response, may generate splat 94 having a specified radius and at a specified position such that splat 94 covers discontinuity 92, such that the set of splats may represent a continuous surface.

In rendering three-dimensional surfaces, different surfaces or different portions of a surface may be at different depths with respect to a viewpoint, such that a portion of a surface may be occluded by another portion of the surface that is closer to the viewpoint. As such, in image reconstruction stage 56, shader units 46 may also determine the visibility of splats in image space to determine, for each pixel, whether a fragment of a splat positioned at the pixel in image space is rendered into framebuffer 16 or whether the fragment of the splat should be discarded from further processing.

Because the set of splats are not sorted based on depth, shader units 46 sometimes may first encounter a first splat that is positioned at a particular pixel in image space and subsequently encounters a second splat which is also positioned at same particular pixel in image space as the first splat, but is of a depth that is farther away from the current viewpoint relative to the first splat. If shader units 46 do not perform depth tests for the first splat and the second splat, shader units 46 may render the second splat over the first splat at the particular pixel in framebuffer 16 even though the second splat has a depth that is farther from the current viewpoint than the first splat for the particular pixel, and should therefore be occluded by the first splat from the current viewpoint.

As shown in FIG. 5B, surfaces 96 and 98 may each be made up of a set of splats. From the perspective of viewpoint 100, all of the splats that make up surface 98 may be behind surface 96. Furthermore, from the perspective of viewpoint 100, each of splats 102, 104, and 106 may intersect the same particular pixel. Specifically, fragment 103 of splat 102, fragment 105 of splat 104, and fragment 107 of splat 106 may, for viewpoint 100, each potentially be rendered to the same pixel. Because shader units 46 may encounter and process splats 102, 104, and 106 in any order, shader units 46 may perform depth tests for the particular pixel intersected by fragments 103, 105, and 107 to determine how each of splats 102, 104, and 106 contributes to the color value of the pixel.

In some examples, for a pixel, shader units 46 may determine a depth offset from the front-most fragment, such that fragments that are behind the front-most fragment by no more than the depth offset are not occluded from view. Instead, fragments having depths that are within the depth offset from the depth of the front-most fragment may, along with the front-most fragment, contribute to the color values of the pixel, even if these fragments are behind the front-most fragment from viewpoint 100. For instance, as described above, in some cases the color values of overlapping fragments may be blended, rather than discarding the fragment that is further back. By determining whether two fragments are within a depth offset, shader units 46 may be able to determine which fragments to blend and which fragments to discard from further processing.

In the example of FIG. 5B, shader units 46 may determine that fragment 103 is the front-most fragment out of fragments 105 and 107. Shader units 46 may also determine depth offset 108, such that fragments that are behind fragment 103 from viewpoint 100 by a depth that is less than or equal to depth offset 108 may still contribute to the color values of the pixel. As shown in the example of FIG. 5B, fragment 107 is behind fragment 103 from viewpoint 100 and is not within depth offset 108 from fragment 103. Therefore, shader units 46 may discard fragment 107 such that fragment 107 does not contribute to the color values of the pixel. Meanwhile, fragment 105 is behind fragment 103 from viewpoint 100 but is within depth offset 108 from fragment 103. As such, fragment 105 may contribute to the color values of the pixel. For example, shader units 46 may output the color values of fragment 105 for the pixel to framebuffer 16. Specifically, shader units 46 may accumulate the color values of fragments 103 and 105 for the pixel into accumulation buffer 28.

Shader units 46 may perform image reconstruction stage 56 by rasterizing a set of splats and executing fragment shader code to render the set of splats, fragment-by-fragment, into framebuffer 16. Each fragment processed by shader units 46 may be a portion of a splat and may include one or more of the pixels making up the portion of the splat. In some examples, each fragment may be a single pixel portion of a splat.

Shader units 46 may, for each fragment, determine whether to render the fragment into framebuffer 16, and, responsive to determining to render the fragment into framebuffer 16, updating one or more associated pixels in framebuffer 16 based on the fragment. Rendering a fragment into framebuffer 16 may include modifying one or more data values in framebuffer 16 of one or more pixels associated with the fragment. For example, shader units 46 may update color values associated with the one or more pixels in the color buffer, depth values associated with the one or more pixels in the depth buffer, and the like.

As discussed above, since splats may overlap each other, such as due to shader units 46 generating splats to cover discontinuities (e.g., holes) between splats, multiple splat fragments may overlap a single pixel in image space. As such, in determining whether to render a fragment into framebuffer 16, shader units 46 may perform a depth test on the fragment to determine whether the depth particular fragment is within an offset of the depth of a fragment that is already rendered to the destination pixel in framebuffer 16 that corresponds to the fragment and, if so, modify the color values associated with the destination pixel in the color buffer of framebuffer 16.

Such a depth test may be performed without previously rendering the three-dimensional object as a depth image into framebuffer 16 at an offset depth and performing depth tests against the depth image, such that only fragments of splats that pass the depth test against the depth image are deemed to be visible and rendered into framebuffer 16. Instead, shader units 46 may execute fragment shader code that reads a depth value from the depth buffer of framebuffer 16 to determine whether, for a destination pixel, the depth for the particular fragment corresponding to the destination pixel is within the offset of the depth value associated with the destination pixel that is retrieved by shader units 46 from the depth buffer of framebuffer 16.

In accordance with aspects of the present disclosure, shader units 46 may, as part of determining whether to render a fragment of a splat to a pixel in framebuffer 16, retrieve from framebuffer 16 a depth value associated with the pixel that corresponds to the fragment of the splat. For example, shader units 46 may retrieve the depth value associated with a destination pixel that corresponds to a fragment of a splat from depth buffer 24 that is included in framebuffer 16. Retrieving the depth value associated with the pixel may include retrieving the depth value of the fragment of a splat that was most recently rendered to the pixel, which may be retrieved by shader units 46 by executing a gl_LastFragDepth( ) function that enables fragment shader code executing on shader units 46 to read from framebuffer 16 the depth value of the fragment of the splat that was most recently rendered to the pixel. In some examples, the depth value may be between 0 and 1, and the depth value may indicate a relative distance between the colors of the pixel and the viewpoint. For example, the smaller the depth value the closer the associated pixel may be to the viewpoint.

Shader units 46 may determine whether a fragment depth value associated with a fragment of a splat is within a non-zero offset of the depth value associated with the pixel. The fragment may be at least a portion of a splat that is positioned at the pixel in two-dimensional image space. In this way, the fragment of the splat may correspond to the destination pixel location in framebuffer 16. For example, given a non-zero offset of $\epsilon$, and given a range of depth values from 0 to 1, where a depth value of 0 denotes that an associated pixel is closest to the viewpoint, shader units 46 may determine that the fragment depth value associated with the fragment of the splat is within the offset if the depth value is smaller than or equal to the sum of the depth value associated with the pixel retrieved from framebuffer 16 and $\epsilon$. Conversely, shader units 46 may determine that the fragment depth value associated with the fragment of the splat is not within the offset if the depth value is greater than the sum of the depth value associated with the pixel retrieved from framebuffer 16 and $\epsilon$.

Responsive to determining that the fragment depth value associated with the fragment of the splat is within the offset of the depth value associated with the pixel, shader units 46 may output updated data associated with the pixel to the framebuffer based at least in part on data associated with the fragment. For example, if shader units 46 determines that the fragment depth value associated with the fragment is smaller than the depth value currently stored in depth buffer 24, thereby indicating that the fragment is relatively closer to the viewpoint than any other fragments previously rendered to the same pixel, shader units 46 may output the fragment depth value associated with the fragment to framebuffer 16 to replace the depth value currently associated with the pixel and stored in depth buffer 24. Shader units 46 may also output the color values associated with the fragment (e.g., red, green, and blue component values along with the alpha value) to framebuffer 16, so that framebuffer 16 may accumulate the color values into accumulation buffer 28. In this way, framebuffer 16 may accumulate, for each destination pixel, RGBA values for each fragment that passes the depth test.

In some examples, shader units 46 may output the updated data associated with the pixel to the framebuffer by generating updated color values based at least in part on the color values associated with the fragment. Shader units 46 may blend the color values associated with the fragment with the color values associated with the pixel retrieved from framebuffer 16 to normalize the color values of the pixel to eliminate visual artifacts. Shader units 46 may retrieve from color buffer 26 in or associated with framebuffer 16 color values associated with the pixel.

For example, shader units 46 may retrieve the color values from framebuffer 16 by executing a gl_LastFragData( ) function that enables fragment shader code executing on shader units 46 to read from framebuffer 16 the color values (e.g., RGBA values) of the pixel stored in framebuffer 16. Shader units 46 may blend the color values associated with the fragment with the color values of the pixel retrieved from framebuffer 16 to produce blended color values, and may output the blended values to color buffer 26 in or associated with framebuffer 16 as the color values for the pixel. For example, given that each of the accumulated color values include RGB values as well as an alpha value, shader units 46 may perform a weighted sum of the RGB values of the fragment and the RGB values of the pixel retrieved from framebuffer 16 that are weighed according to the associated alpha values. Shader units 46 may divide the weighed sum of the RGB values by the sum of the alpha values of the color values of the fragment and the color values of the pixel to produce an updated set of RGB values, such that the updated color values for the destination pixel is the updated set of RGB values computed for the destination pixel and an alpha value of 1. Shader units 46 may store the RGBA values for the pixel into framebuffer 16.

In this way, shader units 46 may blend the color values of the fragment with the color of the pixel contributed by other fragments that pass the depth test for the particular pixel and may store the blended color value for the pixel into the framebuffer. Further, by using the techniques disclosed herein, shader units 46 may for a particular fragment, determine that the fragment depth value associated with the fragment of the splat is within the offset of the depth value associated with the pixel, and, if so, in succession, output color values associated with the pixel to the framebuffer. In this way, shader units 46 may output the color values associated with the pixel to the framebuffer responsive to determining that the fragment depth value associated with the fragment of the splat is within the offset of the depth value associated with the pixel and without shader units 46 performing any intervening depth tests of other fragments.

Responsive to determining that the fragment depth value associated with the fragment is not within the non-zero offset of the depth value associated with the pixel, shader units 46 may discard the fragment, so that shader units 46 does not render the fragment into framebuffer 16. Shader units 46 may determine that the fragment depth value associated with the fragment is not within the non-zero offset of the depth value associated with the pixel if, for example, the fragment depth value associated with the fragment is greater than the sum of the depth value associated with the pixel and the non-zero offset.

Figure 6:
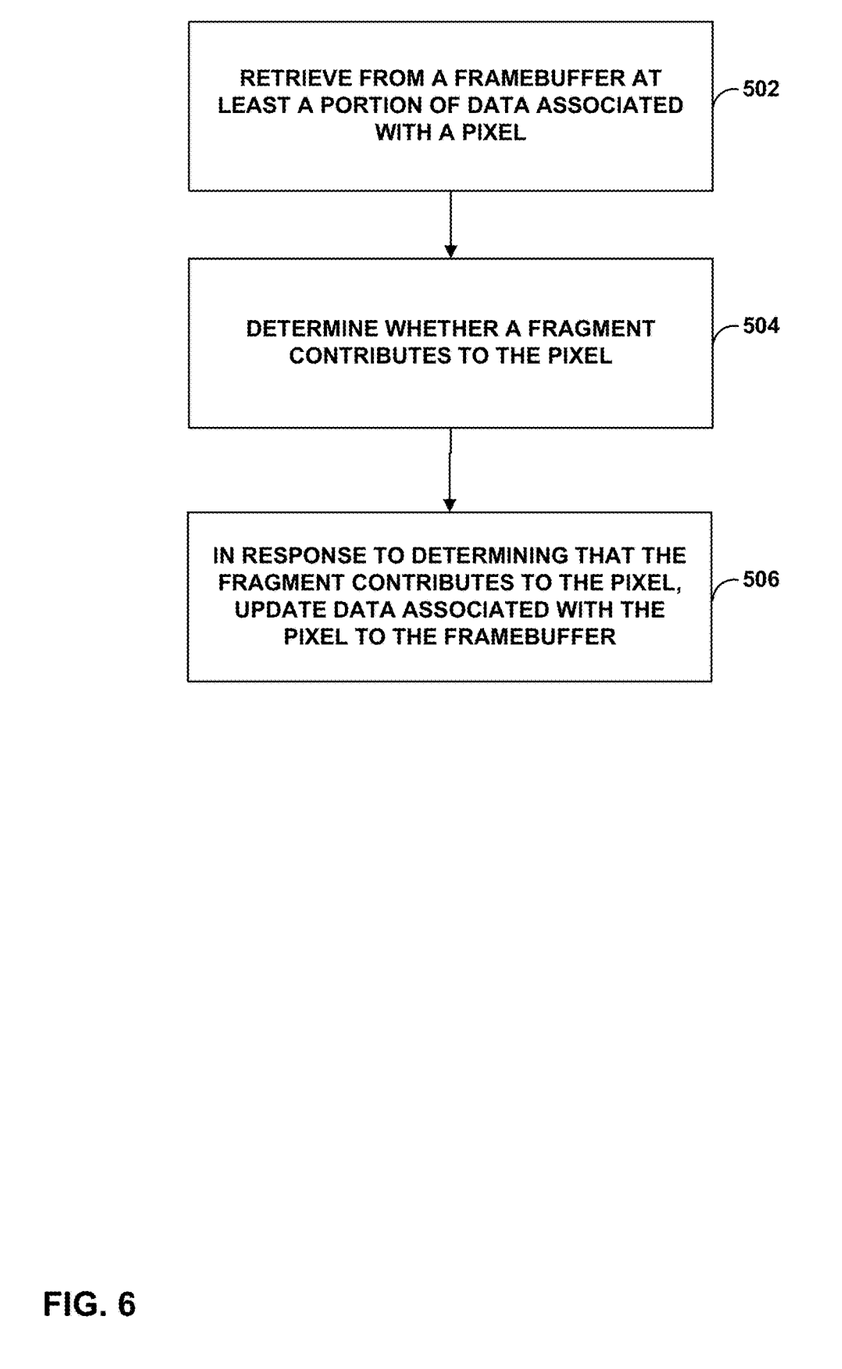
FIG. 6 is a flow chart illustrating an example operation of the GPU.

FIG. 6 is a flow chart illustrating an example operation of GPU 12 in further detail. As shown in FIG. 6, GPU 12 may retrieve from framebuffer 16 a depth value associated with a pixel (602). GPU 12 may further determine whether a fragment depth value associated with a fragment of a splat is within a non-zero offset of the depth value associated with the pixel (604). GPU 12 may, responsive to determining that the fragment depth value associated with the fragment of the splat is within the non-zero offset of the depth value associated with the pixel, output updated data associated with the pixel to framebuffer 16 based at least in part on data associated with the fragment of the splat (606).

In some examples, GPU 12 may determine whether the fragment depth value associated with the fragment of the splat is within the non-zero offset of the depth value associated with the pixel further by determining whether the fragment depth value associated with the fragment of the splat is less than or equal to a sum of the depth value associated with the pixel and the non-zero offset. In some examples, GPU 12 may, responsive to determining that the fragment depth value associated with the fragment of the splat is not within the non-zero offset of the depth value associated with the pixel, discard the fragment of the splat from further processing. In some examples, GPU 12 may retrieve from framebuffer 16 the depth value associated with the pixel by retrieving the depth value associated with the pixel from depth buffer 24 in framebuffer 16.

In some examples, GPU 12 may determine updated color values for the pixel based on color values associated with the fragment of the splat, and may output the updated color values for the pixel to framebuffer 16. In some examples, GPU 12 may determine an updated depth value for the pixel based on the fragment depth value associated with the fragment of the splat and may output the updated depth value for the pixel to framebuffer 16.

In one or more examples, the functions described may be implemented in hardware, software, firmware, or any combination thereof. If implemented in software, the functions may be stored on or transmitted over as one or more instructions or code on a computer-readable medium. Computer-readable media may include computer data storage media or communication media including any medium that facilitates transfer of a computer program from one place to another. Data storage media may be any available media that can be accessed by one or more computers or one or more processors to retrieve instructions, code and/or data structures for implementation of the techniques described in this disclosure. By way of example, and not limitation, such computer-readable media can comprise RAM, ROM, EEPROM, CD-ROM or other optical disk storage, magnetic disk storage or other magnetic storage devices. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The code may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (i.e., a chip set). Various components, modules or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various aspects of the disclosure have been described. These and other aspects are within the scope of the following claims.

The invention claimed is:

1. A method for rendering, comprising:
responsive to determining one or more discontinuities between splats of a plurality of splats, generating, by at least one processor, one or more splats for inclusion in the plurality of splats to cover the one or more discontinuities; and
performing, by the at least one processor, an accumulation pass to render the plurality of splats without performing a separate visibility pass, including rendering a fragment of a splat of the plurality of splats into a pixel by:
determining, by the at least one processor, whether a fragment depth value associated with the fragment of the splat of the plurality of splats is within a non-zero offset of a depth value associated with the pixel that is stored in a framebuffer by comparing the fragment depth value with a previous fragment depth value associated with a previous fragment of the splat that was most recently rendered to the pixel, and
responsive to determining that the fragment depth value associated with the fragment of the splat is within the non-zero offset of the depth value associated with the pixel, outputting, by the at least one processor, updated data for the pixel, including a fragment color value associated with the fragment, to the framebuffer based at least in part on data associated with the fragment of the splat.

2. The method of claim 1, wherein determining, by the at least one processor, whether the fragment depth value associated with the fragment of the splat is within the non-zero offset of the depth value associated with the pixel further comprises:
determining, by the at least one processor, whether the fragment depth value associated with the fragment of the splat is less than or equal to a sum of the depth value associated with the pixel and the non-zero offset.

3. The method of claim 1, further comprising:
responsive to determining that the fragment depth value associated with the fragment of the splat is not within the non-zero offset of the depth value associated with the pixel, discarding, by the at least one processor, the fragment of the splat from further processing.

4. The method of claim 1, further comprising:
retrieving, by the at least one processor, from a depth buffer in the framebuffer, the depth value associated with the pixel.

5. The method of claim 1, further comprising:
retrieving, by the at least one processor from a color buffer of the framebuffer, a current color value of the pixel; and
determining, by the at least one processor, an updated color value for the pixel by blending the current color value of the pixel with the fragment color value associated with the fragment.

6. The method of claim 1, wherein outputting, by the at least one processor, the updated data associated with the pixel to the framebuffer based at least in part on the data associated with the fragment of the splat further comprises:
determining, by the at least one processor, an updated depth value for the pixel based on the fragment depth value associated with the fragment of the splat; and
outputting, by the at least one processor, the updated depth value for the pixel to the framebuffer.

7. A device configured for of graphics processing comprising:
a framebuffer; and
at least one processor configured to:
responsive to determining one or more discontinuities between splats of a plurality of splats, generate one or more splats for inclusion in the plurality of splats to cover the one or more discontinuities; and
perform an accumulation pass to render the plurality of splats without performing a separate visibility pass, including rendering a fragment of a splat of the plurality of splats into a pixel by:
determining whether a fragment depth value associated with the fragment of the splat of the plurality of splats is within a non-zero offset of a depth value associated with a pixel that is stored in the framebuffer by comparing the fragment depth value with a previous fragment depth value associated with a previous fragment of the splat that was most recently rendered to the pixel, and responsive to determining that the fragment depth value associated with the fragment of the splat is within the non-zero offset of the depth value associated with the pixel, outputting updated data for the pixel, including a fragment color value associated with the fragment, to the framebuffer based at least in part on data associated with the fragment of the splat.

8. The device of claim 7, wherein the at least one processor is further configured to:
determine whether the fragment depth value associated with the fragment of the splat is less than or equal to a sum of the depth value associated with the pixel and the non-zero offset.

9. The device of claim 7, wherein the at least one processor is further configured to:
responsive to determining that the fragment depth value associated with the fragment of the splat is not within the non-zero offset of the depth value associated with the pixel, discard the fragment of the splat from further processing.

10. The device of claim 7, wherein the at least one processor is further configured to:
retrieve, from a depth buffer in the framebuffer, the depth value associated with the pixel.

11. The device of claim 7, wherein the at least one processor is further configured to:
retrieve, from the framebuffer, a current color value of the pixel; and
determine an updated color value for the pixel by blending the current color value of the pixel with the fragment color value associated with the fragment.

12. The device of claim 7, wherein the at least one processor is further configured to:
determine an updated depth value for the pixel based at least in part on the fragment depth value associated with the fragment of the splat; and
output the updated depth value for the pixel to the framebuffer.

13. A non-transitory computer-readable storage medium having instructions stored thereon that when executed cause one or more processors to:
responsive to determining one or more discontinuities between splats of a plurality of splats, generate one or more splats for inclusion in the plurality of splats to cover the one or more discontinuities; and
perform an accumulation pass to render the plurality of splats without performing a separate visibility pass, including rendering a fragment of a splat of the plurality of splats into a pixel by:
determining whether a fragment depth value associated with the fragment of the splat of the plurality of splats is within a non-zero offset of a depth value associated with a pixel that is stored in the framebuffer by comparing the fragment depth value with a previous fragment depth value associated with a previous fragment of the splat that was most recently rendered to the pixel, and
responsive to determining that the fragment depth value associated with the fragment of the splat is within the non-zero offset of the depth value associated with the pixel, outputting updated data for the pixel, including a fragment color value associated with the fragment, to the framebuffer based at least in part on data associated with the fragment of the splat.

14. The non-transitory computer-readable storage medium of claim 13, wherein determining whether the fragment depth value associated with the fragment of the splat is within the non-zero offset of the depth value associated with the pixel further comprises:
determining whether the fragment depth value associated with the fragment of the splat is less than or equal to a sum of the depth value associated with the pixel and the non-zero offset.

15. The non-transitory computer-readable storage medium of claim 13, wherein the instructions, when executed, further cause the one or more processor to:
responsive to determining that the fragment depth value associated with the fragment of the splat is not within the non-zero offset of the depth value associated with the pixel, discard the fragment of the splat from further processing.

16. The non-transitory computer-readable storage medium of claim 13, wherein the instructions further cause the one or more processors to:
retrieve, from a depth buffer in the framebuffer, the depth value associated with the pixel.

17. The non-transitory computer-readable storage medium of claim 13, wherein the instructions, when executed, further cause the one or more processors to:
retrieve, from the framebuffer, a current color value of the pixel; and
determine an updated color value for the pixel by blending the current color value of the pixel with the fragment color value associated with the fragment.

18. The non-transitory computer-readable storage medium of claim 13, wherein outputting the updated data for the pixel to the framebuffer based at least in part on the data associated with the fragment of the splat further comprises
determining an updated depth value for the pixel based on the fragment depth value associated with the fragment of the splat; and
outputting the depth value for the pixel to the framebuffer.

19. A device comprising:
means for generating one or more splats for inclusion in a plurality of splats to cover one or more discontinuities between splats of the plurality of splats responsive to determining the one or more discontinuities; and
means for performing an accumulation pass to render the plurality of splats without performing a separate visibility pass, including means for rendering a fragment of a splat of the plurality of splats into a pixel, and further including:
means for determining whether a fragment depth value associated with the fragment of the splat of the plurality of splats is within a non-zero offset of a depth value associated with the pixel that is stored in a framebuffer by comparing the fragment depth value with a previous fragment depth value associated with a previous fragment of the splat that was most recently rendered to the pixel, and
means for outputting updated data for the pixel, including a fragment color value associated with the fragment, to the framebuffer based at least in part on data associated with the fragment of the splat responsive to determining that the fragment depth value associated with the fragment of the splat is within the non-zero offset of the depth value associated with the pixel.

20. The device of claim 19, wherein the means determining whether the fragment depth value associated with the fragment of the splat is within the non-zero offset of the depth value associated with the pixel further comprises:
  means for determining whether the fragment depth value associated with the fragment of the splat is less than or equal to a sum of the depth value associated with the pixel and the non-zero offset.

21. The device of claim 19, further comprising:
  means for discarding the fragment from further processing responsive to determining that the fragment depth value associated with the fragment of the splat is not within the non-zero offset of the depth value associated with the pixel.

22. The device of claim 19, further comprising:
  means for retrieving, from a depth buffer in the framebuffer, the depth value associated with the pixel.

23. The device of claim 19, further comprising:
  means for retrieving, from the framebuffer, a current color value of the pixel; and
  means for determining an updated color value for the pixel by blending the current color value for the pixel with the fragment color value associated with the fragment.

24. The device of claim 19, wherein outputting the updated data associated with the pixel to the framebuffer based at least in part on the data associated with the fragment of the splat further comprises:
  means for determining an updated depth value for the pixel based on the fragment depth value associated with the fragment of the splat; and
  means for outputting the updated depth value for the pixel to the framebuffer.

* * * * *